(12) United States Patent
Schupp et al.

(10) Patent No.: US 12,516,485 B2
(45) Date of Patent: Jan. 6, 2026

(54) FOUNDATION FOR A STRUCTURE

(71) Applicant: c/o Ørsted Wind Power A/S, Fredericia (DK)

(72) Inventors: Jens Schupp, Gentofte (DK); Jens Gengenbach, Gentofte (DK); Jan Pedersen, Gentofte (DK)

(73) Assignee: Ørsted Wind Power A/S, Fredericia (DK)

( * ) Notice: Subject to any disclaimer, the term of this patent is extended or adjusted under 35 U.S.C. 154(b) by 1161 days.

(21) Appl. No.: 17/050,286

(22) PCT Filed: Apr. 12, 2019

(86) PCT No.: PCT/EP2019/059564
§ 371 (c)(1),
(2) Date: Oct. 23, 2020

(87) PCT Pub. No.: WO2019/206690
PCT Pub. Date: Oct. 31, 2019

(65) Prior Publication Data
US 2022/0267980 A1 Aug. 25, 2022

(30) Foreign Application Priority Data
Apr. 23, 2018 (EP) .................................... 18168804

(51) Int. Cl.
*E02D 7/24* (2006.01)
*E02B 17/02* (2006.01)
*E02B 17/00* (2006.01)

(52) U.S. Cl.
CPC ................ *E02D 7/24* (2013.01); *E02B 17/02* (2013.01); *E02B 2017/0065* (2013.01); *E02B 2017/0078* (2013.01)

(58) Field of Classification Search
CPC . E02D 7/24; E02B 17/00; E02B 17/02; E02B 2017/0073; E02B 2017/0078; E02B 2017/0065
(Continued)

(56) References Cited

U.S. PATENT DOCUMENTS 1,173,355 A * 2/1916 Jones ........................ E02D 7/24
405/248
2,649,694 A * 8/1953 Pickman .................. E02D 7/24
405/248
(Continued)

FOREIGN PATENT DOCUMENTS

| EP | 3910113 A1 * | 11/2021 | ............. E02B 17/02 |
| GB | 1561126 A | 2/1980 | |

(Continued)

OTHER PUBLICATIONS

International Patent Application No. PCT/US2019/059564, International Search Report mailed Jul. 30, 2019, 10 pages.
(Continued)

*Primary Examiner* — Frederick L Lagman
(74) *Attorney, Agent, or Firm* — Conley Rose, P.C.

(57) ABSTRACT

A foundation (1) for a structure. The foundation (1) has a body (2) for insertion into a soil in an insertion direction during installation. The body (2) has a toe (8) at its distal end. The toe (2) defines an aperture (11) into an internal cavity (15). Movement of the toe (2) through the soil displaces soil laterally into a displaced soil region within the internal cavity (15). One or more nozzles (10) are provided for directing a fluid to the displaced soil region during installation for transporting soil away from the displaced soil region. A pumping system (24) is also provided for evacu-
(Continued)

ating fluid from the internal cavity (15) during installation for reducing the soil suspension pressure within the displaced soil region.

14 Claims, 5 Drawing Sheets

(58) Field of Classification Search
USPC .................................. 405/224.1, 226, 228
See application file for complete search history.

(56) References Cited

U.S. PATENT DOCUMENTS

| | | | |
|---|---|---|---|
| 3,815,374 A | 6/1974 | Hogan | |
| 3,965,687 A * | 6/1976 | Shaw | B63B 21/27 |
| | | | 405/226 |
| 4,069,681 A | 1/1978 | Mott | |
| 4,189,255 A * | 2/1980 | Macan | E21B 33/037 |
| | | | 405/226 |
| 4,408,405 A * | 10/1983 | Williams | E02D 7/24 |
| | | | 37/322 |
| 4,575,282 A * | 3/1986 | Pardue, Sr. | E02D 5/42 |
| | | | 405/195.1 |
| 7,621,059 B2 * | 11/2009 | McCoy, Jr. | E02F 3/907 |
| | | | 37/317 |
| 7,891,910 B2 * | 2/2011 | Schakenda | E02D 27/52 |
| | | | 405/226 |
| 10,113,290 B2 * | 10/2018 | Nielsen | F03D 13/22 |
| 2020/0248423 A1* | 8/2020 | Madsen | B23K 9/02 |

FOREIGN PATENT DOCUMENTS

| | | | | |
|---|---|---|---|---|
| JP | S5016888 A | | 2/1975 | |
| JP | S514484 U | | 1/1976 | |
| JP | S61162634 A | | 7/1986 | |
| JP | H08302687 A | * | 11/1996 | ........... E02B 17/02 |
| JP | 2002529630 A | | 9/2002 | |
| JP | 2005127095 A | | 5/2005 | |
| WO | 0028153 A1 | | 5/2000 | |

OTHER PUBLICATIONS

Japanese Patent Application No. 2020-558601 Office Action mailed Dec. 20, 2022, 4 pages.

* cited by examiner

FOUNDATION FOR A STRUCTURE

CROSS-REFERENCE TO RELATED APPLICATIONS

This application is a national stage filing of International Application No. PCT/EP2019/059564, filed Apr. 12, 2019, which claims priority to European Application No. 18168804.5, filed Apr. 23, 2018. The entire disclosures of the afore-mentioned patent applications are incorporated herein by reference.

The present invention concerns a foundation for a structure and a method and system for installing the same. In particular, the present invention concerns structural foundations, such as piles, tubular piles, monopiles, jacket piles, suction bucket/caisson foundations and suction anchors, skirted foundations, sheet walls, berthing dolphins, and other types of temporary and permanent shallow or deep foundations, that may be inserted into a soil for supporting structures such as buildings, walls, offshore structures, and wind turbines. It will be understood that suction bucket/caisson foundations are most suited to shallow foundations for jacket structures in water depths up to 100 m and in strong soils. Suction anchors are most suited for anchor chains to tie down floating oil platforms in the deep sea in soft sediments. The present invention is particularly suited to offshore foundations, and more particularly to open ended tubular foundation types, such as monopiles, jacket piles and suction buckets.

Structural foundations are typically installed by forcing the foundation into the ground using a pile hammer to apply a series of axial impacts for driving the foundation down into the soil in an insertion direction. Once installed, the foundation is axially supported by the friction applied to the lateral surfaces of the foundation's body and, to a lesser extent, the resistance to further penetration at the foundation's toe.

During installation, the toe at the distal end of the foundation displaces soil as it is driven down. This compresses the soil in the surrounding region. However, as the foundation is driven deeper, and pressure increases, the forces required to continue displacing soil at the foundation's toe also increase. At the same time, the surface area of the foundation in contact with the soil increases, leading to an increase in the shear forces required to overcome the frictional resistance to driving. As a result, the bearing resistance increases as the foundation is installed deeper into the soil.

In recent years, there has been a trend towards having larger monopile and other foundations, and this has exacerbated the above challenges of their installation. For example, higher impact forces and/or a higher number of hammer strikes are required for pile driving larger foundations. This in turn imposes significant failure resistance requirements on the foundation. At the same time, the noise generated by the larger impacts is also increased, which presents significant environmental and safety hazards.

In view of the above, various methods and systems have been proposed for making the installation of foundations easier. For example, electro-osmosis has been proposed as a mechanism to lower shaft resistance during pile installation by attracting pore water to the foundation body. This thereby lubricates the interface between the soil and the foundation surface. However, whilst research in this area continues, electro-osmosis may not be suitable in all circumstances. As such, there remains a need for other methods and systems for reducing installation resistance during installation of a foundation.

The present invention therefore seeks to address the above issues.

According to a first aspect of the present invention there is provided a foundation for a structure comprising: a body for insertion into a soil in an insertion direction during installation, the body having a toe at its distal end, and the toe defining an aperture into an internal cavity, wherein movement of the toe through the soil displaces soil laterally into a displaced soil region within the internal cavity; the foundation further comprising one or more nozzles for directing a fluid to the displaced soil region during installation for transporting soil away from the displaced soil region; and a pumping system for evacuating fluid from the internal cavity during installation for reducing the soil suspension pressure within the displaced soil region.

In this way, the present invention provides a foundation that may be installed more easily. In particular, the delivery of fluid to the displaced soil region allows transport of sediment away from that region, thereby preventing the region from becoming overly compressed as new soil is displaced into it. This allows the soil bearing failure mechanism at the foundation's toe to continue, whilst the fluid also acts to reduce the friction at the interface between the soil and the foundation body. At the same time, the pumping system acts to evacuate fluid from the internal cavity. For example, air, water and/or other types of fluid can be pumped out of the proximal end of the internal cavity. This in turn reduces the soil suspension pressure within the distally located displaced soil region, and thereby mitigates the effect that increased soil suspension pressure would otherwise counteract the soil bearing failure mechanism as the body penetrates deeper into the soil. Consequently, the fluid carrier and fluid evacuation mechanisms work synergistically to reduce the bearing resistance and internal wall friction. Lower pile driving forces are therefore required for driven piles, allowing less noise to be generated and a smaller pile driving hammer to be used. Once the foundation has been installed to the required depth, the fluid jetting system may then be turned off to allow fluid to drain from the soil and for the soil to restabilise. Furthermore, with the claimed arrangement, the fluid delivered by the nozzles is localised within the internal cavity of the foundation, and consequently the exterior soil remains largely undisturbed, providing for a more stable support for the foundation once installed.

In embodiments, the pumping system evacuates water from the internal cavity. In this way, the height of the water table within the interior of the foundation may be reduced by evacuating water from the water table. In this respect, the pumping system may comprise an intake pipe to draw water from the internal cavity.

In embodiments, the pumping system evacuates air from the internal cavity. In this way, a suction effect is created by a partial vacuum generated within the interior of the foundation. This thereby reduces the atmospheric pressure applied to the water table within the foundation body, which in turn lowers the soil suspension pressure within the displaced soil region.

In embodiments, the foundation further comprises a controller for controlling the pumping system during pile installation to substantially match the soil suspension pressure within the displaced soil region to the fluid pressure within an adjacent region of the soil outside the foundation body. In this way, the difference between the soil suspension pressure and the ambient water pressure in the soil below the eroded surface of the foundation toe is minimised. As such, the force required to displace new soil into the soil suspension is minimised. At the same time, the pressure differential between the soil regions is minimised to avoid compromising the surrounding soil structure.

In embodiments, the controller controls the pumping system to reduce the height of the water table within the internal cavity to below the water level outside the foundation body. In this way, the soil suspension pressure is reduced by reducing the pressure applied by the water above it within the foundation body.

In embodiments, the body comprises a conical region in which the diameter of the foundation increases. In this way, a region of the lateral walls of the foundation may taper outwardly to provide an enlarged footprint. This may be used to generate down force as a consequence of a pressure differential between the inside and outside of this region. A generated down force may assist with the driving of the foundation during installation.

Preferably, the foundation is provided as a hollow foundation. More preferably, the foundation is hollow pile foundation. Even more preferably, the foundation is a monopile. For example, the monopile may comprise a hollow tubular body, with the annulus defining the interior cavity.

Preferably, the toe is tapered. In this way, the bearing resistance is minimised. More preferably, the toe is tapered for displacing soil inward. In this way, soil is displaced into the interior of the foundation body, leaving the exterior soil substantially undisturbed.

In embodiments, the body comprises a conical region. With such an arrangement, by controlling the pumping rate of pumping system, a pressure differential may be created between a higher fluid pressure on the exterior of the conical region relative to a lower pressure on the interior. This may thereby generate a beneficial downward force to assist with installation of the foundation.

Preferably, the one or more nozzles are directed substantially tangentially with respect to a circumference of the foundation body for directing fluid at the body's interior surface. In this way, the fluid may force soil away from contact with the body's interior surface, thereby lubricating the interface and reducing the shear forces required to drive the foundation.

Preferably, the one or more nozzles are directed in a plane that is 60-180 degrees to the insertion direction. In this way, the nozzles may help sediment in the displaced soil region move upward, or proximally, relative to the insertion direction. At lower angles, this may be achieved by promoting soil erosion. However, in particularly preferred embodiments, the nozzles are directed in the range of 90-180 to the insertion direction for directing the fluid flow in a substantially horizontal plane or in a plane angled above the horizontal plane for enhancing this upward movement of sediment. That is, by angling the nozzles upwards, the nozzles may help to reduce the pressure acting on the soil surface which is jetted away and further ease the inwards bearing failure below the toe. In this respect, the eroded soil forms a suspension of higher density than the water, and thereby results in a higher suspension pressure in comparison to the ambient water pressure in the soil below the eroded surface. This causes a water flow from the suspension into the soil and hence vertical downwards stresses which would otherwise increase the installation resistance. The pumping system thereby acts to mitigate this effect by reducing the soil suspension pressure. In some embodiments, at least some of the high pressure jets may also face upwards to thereby to lift the suspension in the annulus and reduce the suspension pressure above the jetting front. This may therefore also help to reduce the installation resistance.

In embodiments, the one or more nozzles are fed by a pressurised fluid supply. Preferably, this pressurised fluid supply is in excess of 10 bar relative to the ambient fluid pressures, and more preferably above 80 bar relative to the ambient fluid pressures, and even more preferably above 100 bar relative to the ambient fluid pressures.

In embodiments, the one or more nozzles comprise a plurality of nozzles, with the plurality of nozzles being distributed around the body's interior surface. In this way, fluid may be delivered around the circumference of the soil column for providing a more uniform lubricating effect. In embodiments, the plurality of nozzles are distributed over a region of the body's interior surface extending along the foundation's axis.

In embodiments, the foundation further comprises one or more low pressure nozzles for delivering fluid to soil proximal to the displaced soil region. In this way, a lower pressure fluid flow may be provided for enhancing the sediment transport flows away from the displaced soil region.

In embodiments, the one or more low pressure nozzles comprise a plurality of low pressure nozzles, with the plurality of low pressure nozzles being distributed around the body's interior surface. In this way, fluid may be delivered around the circumference of the soil column for providing more uniform upward sediment transport flows within the annulus of the foundation.

Preferably, the fluid comprises water. The fluid may be, for example, seawater, or an aqueous solution or suspension. For instance, viscosity increasing additives, such as bentonite, may be provided in the fluid for mitigating the risks of soil column collapse. In this respect, a controller may be provided for controlling the pressure, flow rate and/or composition of the fluid delivered through the nozzles and/or vents to manage the properties of the soil column and thereby minimise the risk of its collapse.

According to a second aspect of the present invention, there is provided a structural foundation system, comprising: a foundation according to the above; and a pressurised fluid supply for supplying the fluid to the nozzles.

According to a third aspect of the present invention, there is provided a method of installing a foundation according to the above, the method comprising: inserting the toe into the soil; forcing the body in the insertion direction; supplying the fluid to the nozzles to direct the fluid at the displaced soil region; and driving the pumping system to evacuate fluid from the internal cavity to reduce the soil suspension pressure within the displaced soil region.

Preferably, the method further comprises the step of controlling the pumping system to substantially match the soil suspension pressure within the displaced soil region to the water pressure within a laterally adjacent region of the soil outside the foundation body. In this way, the difference between the soil suspension pressure and the ambient water pressure in the soil below the eroded surface of the foundation toe is minimised.

Preferably, the step of controlling the pumping system comprises controlling the pumping system to reduce the height of the water table within the internal cavity to below the water level outside the foundation body.

Illustrative embodiments of the present invention will now be described with reference to the accompanying drawings in which.

Figure 5A:
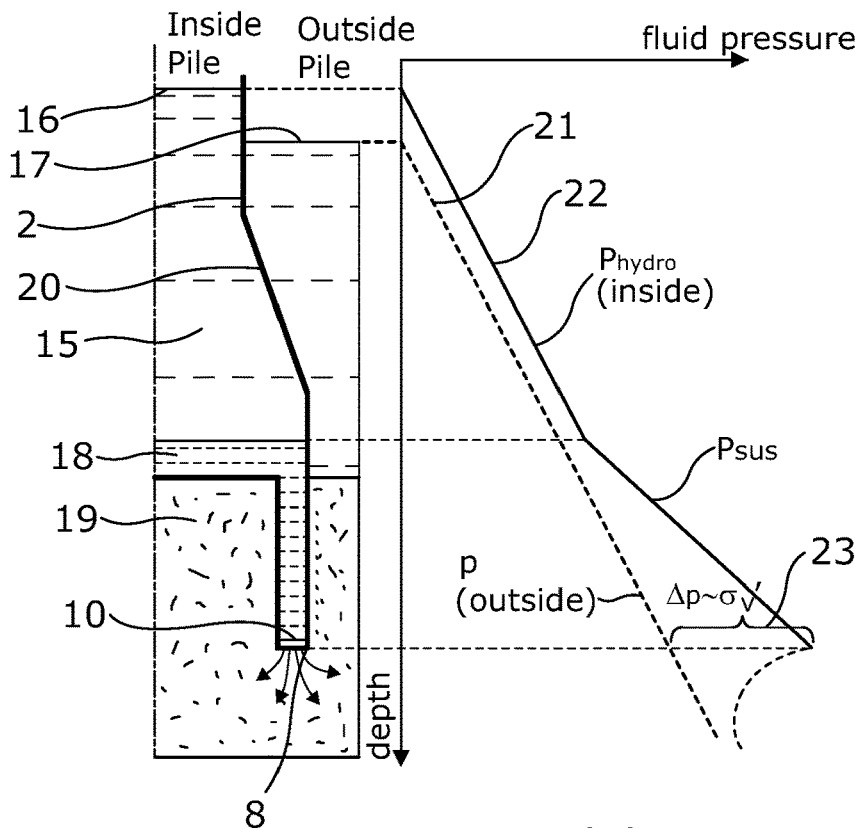
Figure 5B:
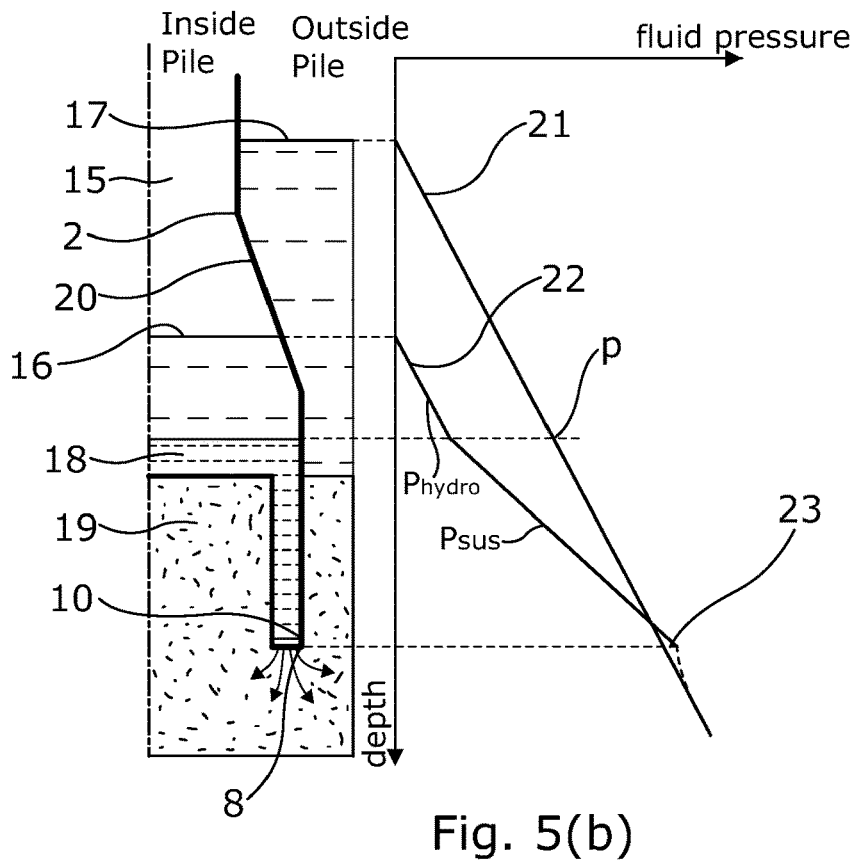
Figure 6:
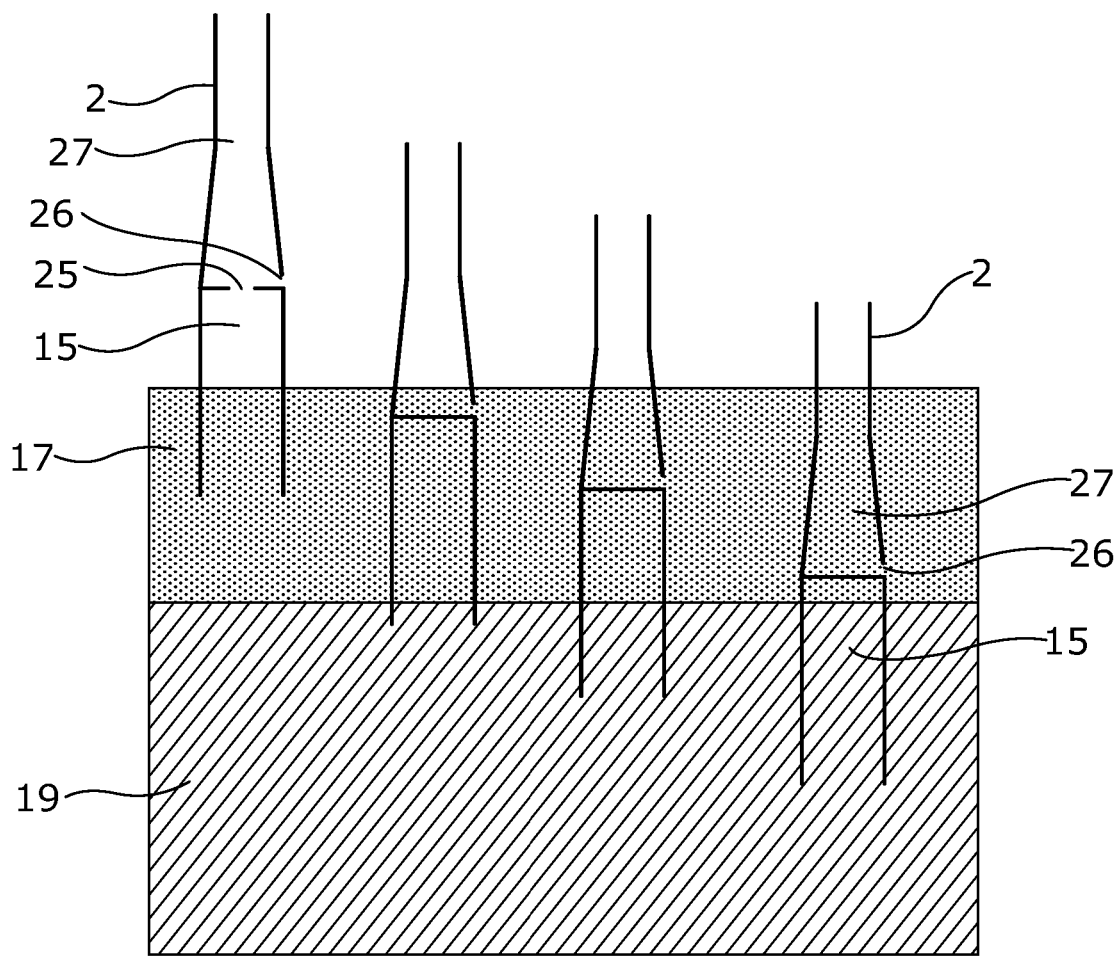

FIG. 5 shows a cross-sectional schematic view through a distal end of the foundation body according to a second embodiment of the invention, with (a) showing without water table control and (b) showing with water table control; and FIG. 6 shows a cross-sectional schematic view of a foundation according to a third embodiment of the invention, with views (a) to (d) showing the foundation during stages of installation.

Figure 1:
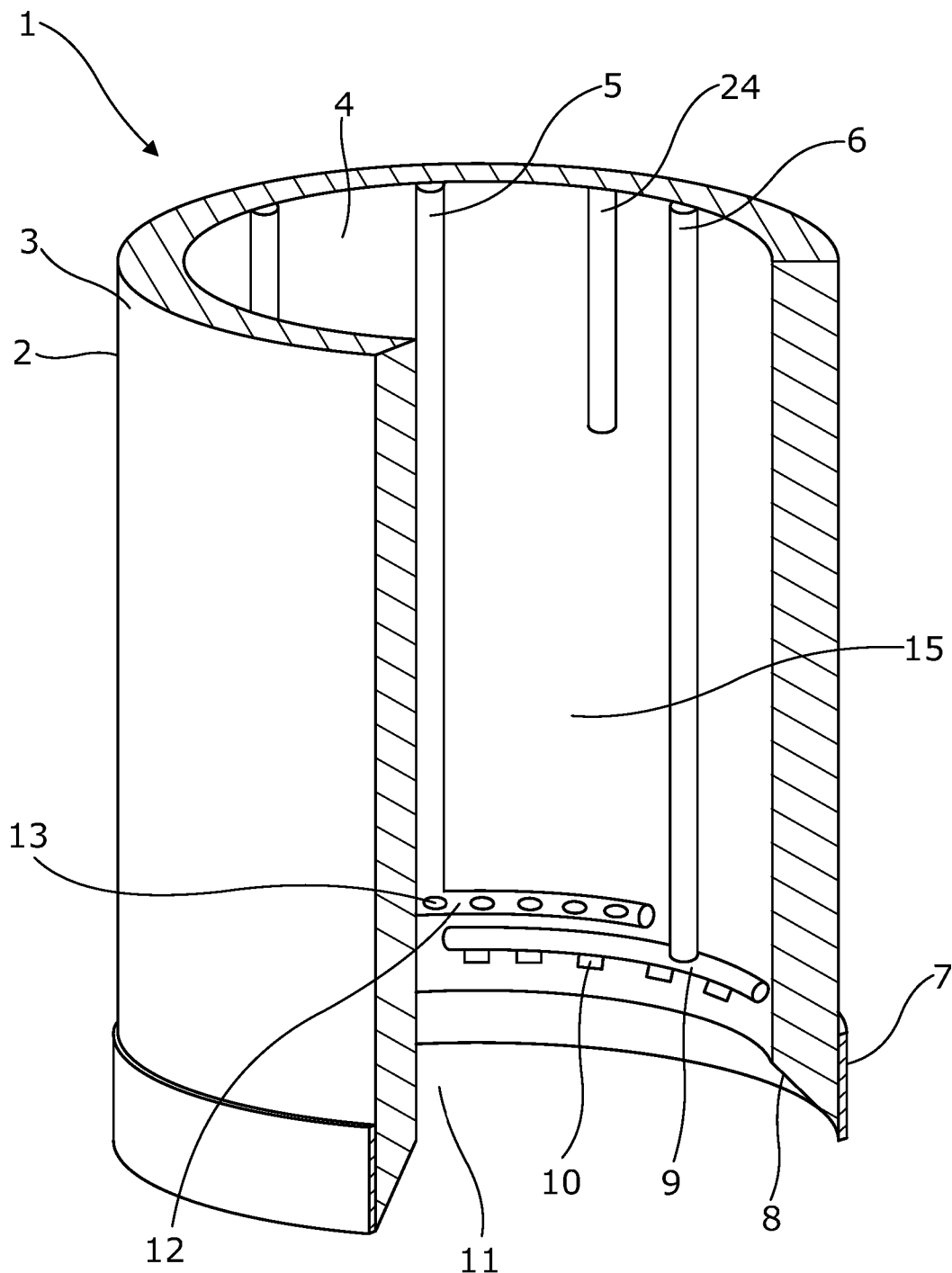
FIG. 1 shows a sectioned isomeric view of a foundation according to a first embodiment of the invention.

FIG. 1 shows a sectioned isometric view of the distal end region of a foundation according to a first embodiment of the invention. In this embodiment, the foundation 1 is a monopile.

The foundation 1 comprises a hollow tubular body 2 having an exterior lateral surface 3, and an interior lateral surface 4 that defines an interior cavity in the form of bore 15. The distal end of the body comprises a toe 8, which defines an aperture 11 and has a radially inward-facing tapered surface for directing soil toward the internal bore 15.

Step 7 forms an indent on the exterior lateral surface 3, above the distal end of the toe 8 for providing a friction break, as will be discussed in further detail below.

Figure 2:
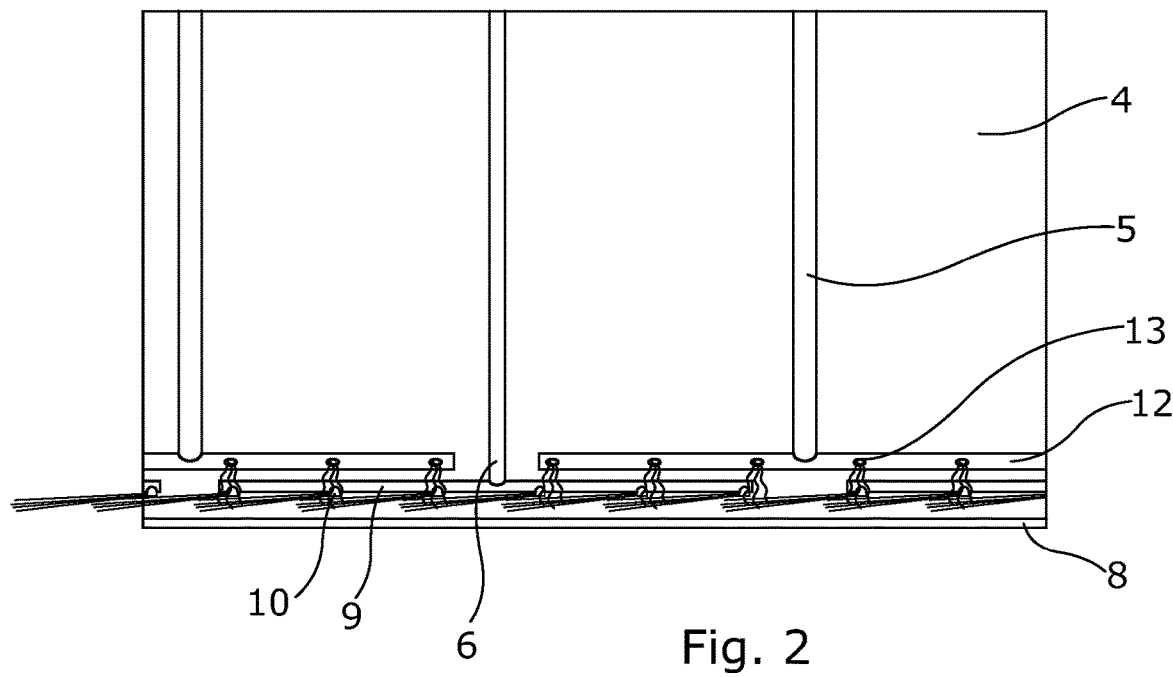
FIG. 2 shows a plan view of the interior surface of the distal end of the foundation shown in FIG. 1.

As shown in FIG. 1, and in plan view in FIG. 2, the interior of the foundation is provided with a fluid jetting system having a plurality of high pressure feed pipes 6 that each extend distally down the interior surface and feed into a high pressure manifold 9. Each high pressure manifold 9 extends a distance circumferentially around the bore 15 and distributes fluid to a plurality of nozzles 10.

In this embodiment, the fluid jetting system further comprises a plurality of low pressure feed pipes 5 that each extend distally down the interior surface 4 and feed into a low pressure manifold 12. Each low pressure manifold 12 extends a distance circumferentially around the bore 15 and distributes fluid through a plurality of low pressure nozzles or vents 13.

The low pressure manifolds 12 are located in a lateral plane that is axially above the lateral plane of the high pressure manifolds 9. As shown most clearly in FIG. 2, the high pressure manifolds 9 and the low pressure manifolds 12 are circumferentially distributed so that their respective nozzles 10 and vents 13 are spaced evenly around the circumference of the interior surface 4 for, in use, delivering fluid around the circumference of a soil column located in bore 11. At the same time, the vents 13 are able to feed low pressure fluid into soil suspension formed from the soil eroded by the water nozzles 10.

As shown in FIG. 1, the interior of the foundation is further provided with an evacuation pumping system 24 which is used to evacuate fluid accumulated in the proximal end of the internal bore 15. In this embodiment, the pumping system comprises an evacuation pipe 24 which connects to a pump (not shown) and is configured to sit below the internal water table during foundation installation and draw water from the table.

Figure 3A:
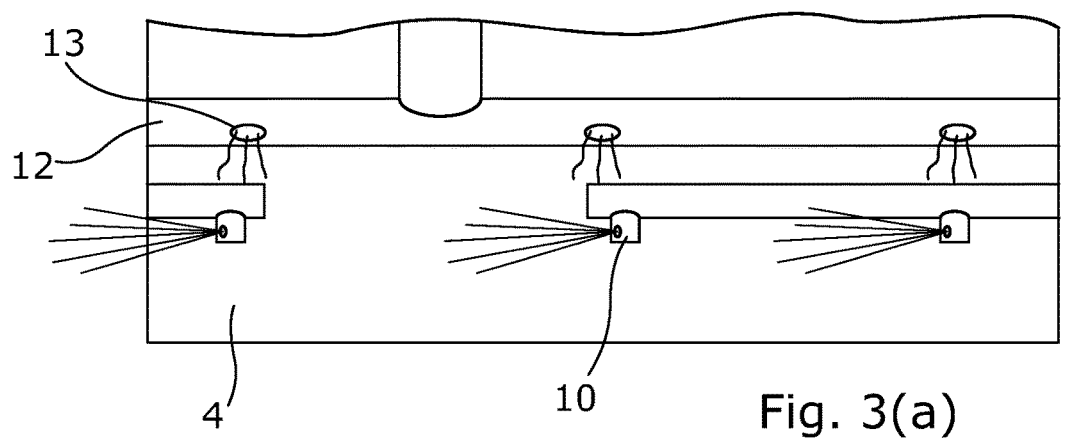
FIG. 3 shows an enlarged view of the nozzles shown in FIG. 2, with (a) showing a plan view of the interior surface and (b) showing a cross sectional view through the foundation body.
Figure 3B:
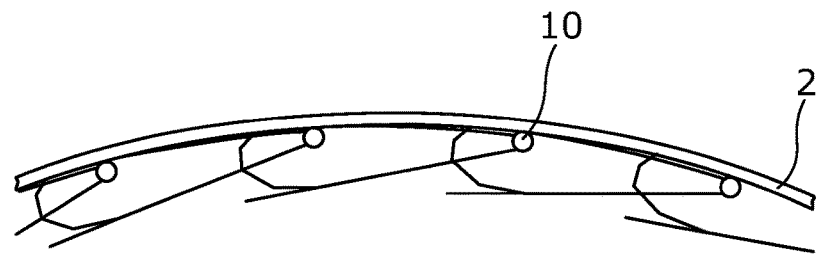

FIG. 3(a) shows an enlarged view of the nozzles 10 and the low pressure vents 13 shown in FIG. 2. FIG. 3(b) shows a cross sectional view through the foundation body in line with the nozzles 10. As shown, the nozzles 10 are directed tangentially, in a lateral plane that is 90 degrees to the foundation's direction of insertion. The flow of fluid from the nozzles 10 is directed over the interior surface 4 of the foundation. Furthermore, the spray from each nozzle 10 is directed to encompass the adjacent nozzle to the left (as illustrated), to thereby prevent debris accumulation at the nozzles.

The low pressure vents 13 are directed radially inward and open at, in this embodiment, 50 degrees to the foundation's direction of insertion. As such, low pressure fluid may be fed into the soil suspension located above the high pressure manifolds 9.

Figure 4:
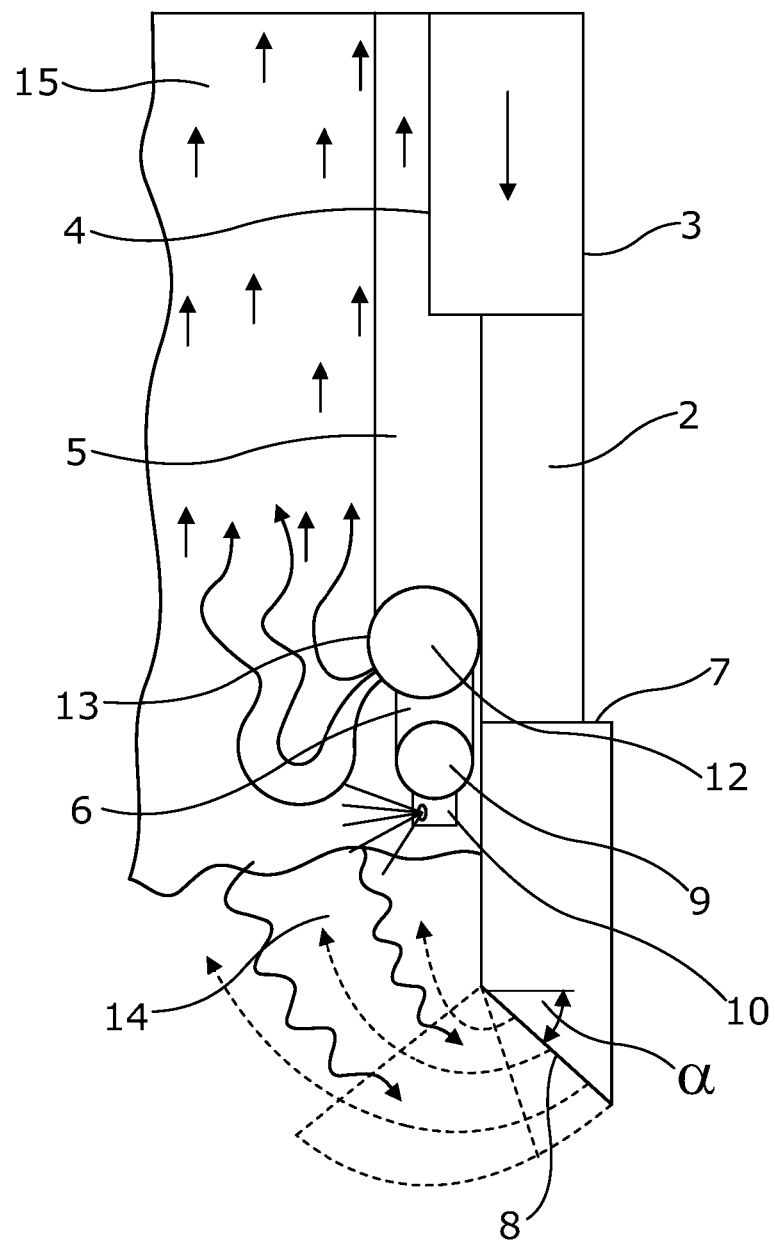
FIG. 4 shows a cross-sectional schematic view through a distal end of the foundation body according to the first embodiment.

FIG. 4 shows a cross-sectional schematic view through a distal end of the foundation body 2, once the end has been inserted into the soil. The foundation's annulus defines the internal bore 15 which fills with a soil suspension defining a soil column.

During installation, the toe 8 penetrates axially downward in the insertion direction through the soil. Step is provided to act as a friction break for minimising wall friction over the exterior surface 3 of the foundation body 2. That is, during soil penetration, the exterior surface 3 immediately above the step 7 is separated from the adjacent soil by the space provided by the step 7. Although elastic half space relaxation may bring the soil back in contact with the exterior surface 7 further up the foundation, the separated region will have lower frictional resistance. Once the installation is complete, the soil will relax to fill the space formed by step 7, thereby increasing the axial load bearing capacity of the foundation 1. The gap will also fill with sediment trickling down the outer surface of the annulus. The lateral loading of the pile will cause this new sediment to compact.

As the toe 8 penetrates through the soil, its taper acts to reduce the toe's bearing resistance. Preferably, the angle of the taper is in the range of 40-degrees, and more preferably in the range of 45-75 degrees, and even more preferably in the range of 50-60 degrees, for minimising bearing resistance, without unduly compromising the mechanical strength of the toe's distal tip.

Soil is forced radially inward by the toe's taper as it moves through the soil. This thereby displaces the soil laterally adjacent to the distal end of the foundation body 2 into a displaced soil region 14 at the bottom of the bore 15 filled with the soil suspension. As the foundation continues to be driven further down, the displaced soil region 14 would effectively expand downwardly too, as new soil is compressed inward. In conventional foundations, over time, this would begin to restrain further soil displacement as the bore 15 fills with further soil and becomes more compressed. To address this, nozzles 10 act to deliver a high pressure, low flow, liquid for removing soil from the displaced soil region 14.

In this connection, during installation, nozzles 10 supply jets of high pressure water to the displaced soil region 14. In this embodiment, water is fed to nozzles 10 through the high pressure feed pipes 6 at 100 bar. In some embodiments, the water supply may also include viscosity increasing additives or finest particles, which may then help form a filter cake around the soil column within the bore 15. The filter cake may act as a water barrier so that a higher suspension pressure can exert a stabilizing force on the soil column. However, preferably, any such additives are fed through the low pressure vents, rather than the high pressure nozzles, to avoid adversely affecting the jetting efficiency of these nozzles. The tangential direction of nozzles 10 causes the jetted water to push soil away from the interior surface 4 of the foundation body 2 and hence reduces friction over this surface. At the same time, the high pressure, low flow, water jets act to break up and suspend the soil above the displaced soil region 14 to form a dense soil slurry for upward sediment transport. This moves soil relatively upward from the displaced soil region 14 and hence avoids the soil in this region from becoming overly compressed. As such, the build up of resistance to further soil displacement at the toe 8 is minimised. At the same time, a proportion of the jetted water drains downward to balance the negative pore pressure as the soil dilates in the displaced soil region 14. This further acts to reduce the bearing resistance at the toe 8. The shape and direction of nozzles 10 may be configured to control the tangential, vertical and horizontal spread of the high pressure fluid flow for optimising the above effects. For example, it is envisaged that the nozzle 10 may be provided with flat square shape, similar to that provided on high pressure car washing nozzles, for creating a jetting fan.

The upward sediment transport in the annulus filled with the soil suspension is further enhanced by the delivery of low pressure, high flow, liquid from the vents 13. In this embodiment, water or bentonite solution is fed to the vents 13 through the low pressure feed pipes 5 up to bar gauge pressure. The rate of fluid delivery is monitored to control the thickness of the soil slurry for minimising the risk of soil column collapse. If the soil column within the annulus were to collapse, the fluid transport channels would be narrowed, causing fluid pressure to build up due to hydraulic resistance and increased internal wall friction. This could then cause a build up of excessive friction unless new flow channels form. However, by maintaining a high slurry density, a sufficient counterbalancing pressure may be generated to avoid this. To further assist with this, the liquid delivered from the vents 13 may also comprise viscosity increasing additives or finest particles. In this way, the soil column may be better stabilised by reducing the drainage of water into the soil column due to the presence of a filter cake or because of an increased fluid viscosity (or due to thixotropic properties). Furthermore, the viscosity increasing additives or finest particles may also reduce the settlement velocity (terminal velocity) of the suspended soil particles in the suspension and allow for an upwards transport of even larger sand grains.

In this connection, to explain this in further detail, during the installation process the use of the jetting system on the inside of the pile forms a fluid-filled annulus around an internal soil column. This internal soil column will require lateral support, either mechanically or via fluid pressure, in order not to collapse. In the latter case, the fluid pressure acting on the soil column wall needs to be greater than the pressure the soil column would exert onto a mechanical restraint. Since the soil column wall is porous and since the soil column can duct water, the supporting force from fluid pressure can be achieved by a pressure gradient in the surface region of the soil column wall. As such, fluid at an elevated pressure in the annulus will drain into the soil column, where ambient fluid pressure levels are present, with the pressure gradient in this transition providing the horizontal stresses required to stabilize the soil column. However, in very permeable soils, this gradient may be too small to achieve the required horizontal stresses. Nevertheless, suspended finest particles in the soil within the annulus may form a filter cake on the soil column surface as the water drains into the soil column. This results in a low permeable layer in which a steeper pressure gradient develops. Alternatively, or in combination, the viscosity of the fluid in the annulus can be increased to enhance the pressure gradient. The pressure gradient from fluid dynamic friction in the soil means that fluid pressure is transferred into the soil grain skeleton, increasing the grain to grain contact stresses (effective stresses). It is also envisaged that other embodiments may include features for promoting soil column permeability in vertical direction in order to drain water ingress towards the seabed surface and, hence, provide an improved hydrostatic vertical pressure distribution inside the soil column. For example, it has been envisaged that the foundation may include an element for drilling or punching a vertical hole through the soil column. This may be advantageous where the soil column consists of layered soils, which would otherwise reduce upwards drainage inside the soil column, particularly, if intermittent clay layers are present.

Despite the above described use of nozzles to deliver a fluid carrier for reducing soil pressures, as the foundation is driven deeper, other restraining mechanisms preventing the further displacement of soil come into play. In particular, at deeper installation depths, the fluid pressure within the soil suspension becomes significantly greater than the ambient water pressure in the soil below the eroded soil surface. This counteracts the bearing failure mechanism at the foundation toe 8 and thereby increases toe resistance. To address this problem, an evacuation pumping system 24 is provided. In particular, during pile installation, a controller controls the evacuation pumping system 24 to remove water from the water table within the internal bore 15. This in turn reduces the soil suspension pressure at the displaced soil region adjacent the toe 8 to thereby control the pressure differential between the soil regions either side of the toe.

The effect of soil suspension pressure is described in further detail in relation to FIG. 5. FIG. 5 shows a second embodiment of the invention. This second embodiment is substantially the same as the first embodiment, but the foundation provided is a conical monopile, with the foundation body 2 having a conical region 20.

As with the first embodiment, the second embodiment comprises an evacuation pump (not shown) for controlling the water table level within the bore 15 to thereby reduce the soil suspension pressure counteracting the bearing failure mechanism at the foundation's toe 8. In particular, FIG. 5 shows cross-sectional schematic views through a distal end of the foundation body 2 together with plots showing how fluid pressure increases with depth. FIG. 5(a) shows a situation where the height of the water table 16 has not been controlled, and FIG. 5(b) shows when the pump has been activated to control the height of the water table 16 within the bore 15.

As shown in FIG. 5(a), the toe 8 of the foundation body 2 is driven into the soil 19 of the seabed, with fluid being pumped from nozzles 10. The fluid forms a soil suspension 18 in the region adjacent to the lateral wall of the foundation body 2, up to and across the seabed within the foundation's bore 15. In this first scenario, where seawater accumulated within the interior of the foundation cannot escape, the bore 15 becomes further filled with soil suspension and fluid from nozzles 10. This results in the water table 16 inside the bore 15 sitting above the water level 17 of the seawater outside the foundation.

In this connection, as shown by plot 21 of FIG. 5(a), outside of the foundation, the fluid pressure p increases linearly as depth increases due to the increasing weight of the water column above. Plot 22 shows the fluid pressure inside the annulus. As will be understood, the water pressure $P_{hydro}$ within the bore 15 is higher than the outside water pressure due to the higher level of the water table 16, albeit that the water pressure increases at the same gradient. However, at the depth at which the water transitions into the soil suspension 18 within the annulus, the pressure gradient increases due to the increased density of the soil suspension 18. As such, the steeper pressure gradient produces much higher fluid pressures $P_{sus}$ within the soil suspension compared to the pressure outside the foundation body 2. This is represented by the pressure differential 23 between the inside plot 22 and outside plot 21 at the depth of the toe 8. As a consequence, this increased pressure within the interior of the foundation counteracts the bearing failure mechanism at the toe 8, thereby resisting further toe penetration. That is, the pressure differential 23 resists the displacement force generated as the toe 8 is driven deeper. As installation depths increase, greater driving forces would therefore be required to overcome the toe installation resistance and continue to displace soil laterally into the higher pressure soil region within the bore 15.

Embodiments of the invention address the above issue by lowering the soil suspension pressure $P_{sus}$ at the toe 8. FIG. 5(b) shows a schematic of how the soil suspension pressure is lowered using the evacuation pump. As water is drawn out of the bore 15, the height of the water table 16 is lowered. This results in a lowering and shortening the length of the water pressure $P_{hydro}$ component of the inside pressure plot 22. Consequently, the suspension pressure $P_{sus}$ component of plot 22 starts at a much lower fluid pressure. As such, by controlling the height of the water table 16, the fluid pressure at the toe can be reduced to thereby more closely match the surrounding ambient fluid pressure, and thereby minimise the toe installation resistance. In particular, as shown in FIG. 5(b), the pressure differential between the inside plot 22 and outside plot 21 at the depth of the toe 8 is minimised. That said, it will be understood that it is necessary to control the height of the water table 16 to avoid the soil suspension pressure at the toe 8 being significantly lower than the fluid pressure in the surrounding soil. For example, if the pressure is too low, the surrounding soil outside the foundation may be excessively weakened due to a reversal of the pore pressure gradient around the toe, leading to pore water ingress. Hydraulic failure may then occur once vertical effective stresses in the soil are reduced to zero. Control over the height of the water table may be achieved by controlling the pumping rate of the evacuation pump. The fluid flow rate at the nozzles 10 may also be controlled.

TABLE 1 annexed below shows some illustrative mathematical modelling of an example pile foundation according to an embodiment of the invention under example conditions. As shown, at 5 metres depth the installation toe resistance is 70 tons. However, at an installation depth of 30 metres, by reducing the table height inside the pile from 27.5 m to 12.5 m above seabed, the installation toe resistance can be reduced to 36 tons instead of increasing to more than 2000 tons in this example. As such, the installation toe resistance can be kept at very low levels as the pile is driven deeper.

The feature of the conical region 20 of the embodiment shown in FIG. 5 will now be described. As shown in the cross-sectional views in FIG. 5, the foundation's body 2 is flared, with the conical region 20 transitioning from a narrower diameter section into a larger diameter end section. The conical region 20 is configured to sit below the outside water line 17 but above the mud line of the seabed. In the scenario shown in FIG. 5(a) where the inside water table 16 is higher than the outside water level 17, the conical region 20 would have a detrimental buoyancy effect. That is, owing to the higher fluid pressure inside the bore 15, the fluid pressure $P_{hydro}$ acting against the interior face of the conical region 20 would be higher than the outside fluid pressure $P_{hydro}$ acting against the exterior face of the conical region 20. This would result in a net upward buoyancy force acting against the direction of installation. However, in the scenario shown in FIG. 5(b), where the height of the inside water table 16 is reduced, a beneficial downward force is generated by the pressure differential between the higher pressure applied to the exterior of the conical region 20 relative to the lower pressure on the interior of the conical region 20. As such, by controlling the pumping rate of the evacuation pump, the down force generated by the conical region 20 may be controlled.

Whilst the above embodiment shown in FIG. 5 controls the soil suspension pressure at the toe by adjusting the height of the water table, other means for controlling the soil suspension pressure are also envisaged. In particular, in an alternative embodiment of the invention is shown in FIG. 6 in which an evacuation pump is used to generate a suction effect.

In this connection, FIG. 6 shows a cross-sectional schematic view of a foundation according to a third embodiment of the invention. In this embodiment, the annulus of the foundation body 2 is provided with a closable vent 25 which connects between an upper chamber 27 and bore 15. As such, with the vent 25 closed, the top to bore 15 provides a dome in the internal cavity within which a suction effect can be created. The upper chamber 27 comprises a cable hole 26 which allows water to enter the chamber. In FIG. 6(a), the foundation body 2 is lowered through the splash zone of the water 17. Vent 25 is opened to allow air within bore 15 to be forced out as the body 2 is lowered into the water 17. In FIG. 6(b), the body begins to penetrate the soil 16 under its own weight as outside water enters the upper chamber 27 through cable hole 26. The vent 25 may be closed once air in the bore 15 has been evacuated. At this stage, the nozzles (not shown) also start jetting fluid within the bore 15 to ease the body's passage through the soil. In FIG. 6(c), the pumping system (not shown) begins to evacuate water from bore 15. This builds the suction effect inside the bore cavity. In particular, by evacuating water from the bore 15, a significant pressure differential can be created relative to the fluid pressure from the upper chamber 27 above, which is filled with water. This thereby generates a considerable down force for driving the foundation body to its final penetration depth, shown in FIG. 6(d), while also reducing the suspension pressure which is required to keep the toe resistance at reasonably low levels. Once at this final penetration depth, the pumping and jetting systems are stopped. In embodiments, the nozzles may be used to deliver grouting material within the annulus in order to secure the foundation.

In installations where the outside water level is too low for the bore 15 to be completely filled with water, embodiments of the invention are also envisaged where air is evacuated from the bore 15. In this case, the foundation body would require an enclosed roof at the proximal end of its internal cavity so that a partial vacuum can be created. By lowering the air pressure within the cavity, an upward suction effect is applied to the water table, lowering the fluid pressure of the water. In turn, this lowers the soil suspension pressure $P_{sus}$ at the toe 8. However, with such suction embodiments, the installation depth may be limited by the level of partial vacuum that can be created, for example by the power of the evacuation pump. Suction alone may therefore not be able to maintain a sufficiently low soil suspension pressure at the toe for deeper installation depths.

In addition to the above, it will also be understood that embodiments of the invention may also control both the water table height and the suction forces in combination to reduce suspension pressure at the pile toe 8.

Accordingly, it will therefore be appreciated that the inventive arrangement disclosed herein allows a foundation to be installed into the soil more easily. This reduces cost and allows installation noise to be minimised.

In this connection, with embodiments of the present invention, the soil failure mechanism at the foundation toe to continue through the pile installation process as the foundation penetrates deeper and new soil is displaced. As such, in embodiments where pile driving is used, lower pile driving forces are required, allowing for the use of a smaller pile driving hammer and less noise to be generated. After the foundation has been installed to the required depth, the fluid jetting system may be turned off to allow water to drain from the annulus as the suspended soil particles settle to form a sediment which may compact over time through cyclic shake down effects, thereby restabilising the soil.

Importantly, the delivery of fluid during installation is localised within the internal bore of the foundation. As such, the structure of the soil on the outside of the foundation is largely undisturbed, other than a localised region of lateral compression by the foundation body. The exterior soil is therefore able to maintain its structure for supporting the foundation, and the lateral compression will act to increase elastic half-space stresses and improve foundation stiffness and strength. This contrasts with conventional liquid excavation techniques where a body of soil is flooded with pressurised liquid to excavate space for a foundation. With this type of conventional methodology, soil is removed in an uncontrolled manner, and the excavated site is effectively refilled with reclaimed soil once the foundation is in place. However, as the soil re-filling the space is newly located, it has little developed structure and will therefore be inherently weaker as a result.

It will be understood that the embodiment illustrated above shows an application of the invention only for the purposes of illustration. In practice the invention may be applied to many different configurations, the detailed embodiments being straightforward for those skilled in the art to implement.

For example, although in the above illustrative embodiment the foundation's fluid jetting system comprises both high pressure nozzles and low pressure nozzles, it will be understood that the invention may be implemented in embodiments using only the high pressure nozzles.

It will also be understood that additional features may further enhance the reduction in driving resistance. For instance, aerofoil shaped deflectors may be provided for deflecting the water jetted from the nozzles on a curved path upwards to thereby cause a suction effect below. In another arrangement, some of the nozzles may be angled upward to create a pressure against the downward facing hydrostatic pressure. This upward direction of the jetted water would also promote the upward transport of sediment.

It will also be understood that additional mechanisms and systems may be also used in combination with the fluid jetting system for further reducing driving resistance. For instance, the foundation may further incorporate electrodes for electro-osmosis. Furthermore, the fluid jetting system may work synergistically with the electro-osmosis system. In one example arrangement, a stinger is provided down the centre of the soil column, an anode is provided on the interior surface of the foundation wall, and bentonite solution is injected using the fluid jetting system. A voltage may then be applied between the electrodes to generate an electro-osmotic effect for exerting inwards pressure in the soil column. This may thereby mitigate the risk of the soil column collapsing. Moreover, if the soil column were to collapse, the polarity of the electrodes could be reversed to lubricate the filter cake.

Although in the above illustrative embodiment, the foundation was a monopile, it will nevertheless be understood that other foundations are also possible, such as bucket foundations. The present invention may also allow for simplified retraction of the foundation during decommissioning. In particular, the nozzles may be used to apply high pressure fluid for reducing friction over the interior surface of the foundation as it is withdrawn.

Finally, although in the above illustrative embodiment reference is made to reducing the pile driving forces required to install a monopile foundation, it will be understood that in embodiments where the invention is applied to suction bucket foundations, reduced suction forces will be instead required to install the foundation under suction pressure.

TABLE 1

| Constants | | |
| --- | --- | --- |
| Water unit weight, $\gamma w$ | kN/m^3 | 10 |
| Steel unit weight, $\gamma steel$ | kN/m^3 | 78 |
| Unit weight grains, $\gamma g$ | kN/m^3 | 26.5 |
| Gravity | m/s^2 | 9.81 |
| Atmospheric presume outside pile, p_out | kPa | 101 |
| Dimensions and soil parameters | | |
| Total pile length, L | m | 70 |
| Pile diameter top, D_t | m | 7 |
| Pile diameter bottom, D_b | m | 11 |
| Top of conical section above seabed, H_ct | m | 22 |
| Bottom of conical section above seabed, H_ | m | 2 |
| Average pile wall thickness, w_av | m | 0.06 |
| Pile toe width, w | m | 0.08 |
| Water depth, h | m | 30 |
| Total installation depth, d | m | 30 |
| Anulus width, w | m | 0.2 |
| Effective soil unit weight, $\gamma s'$ or $\gamma 2'$ | kN/m^3 | 11 |
| Internal angle of friction, phi | deg | 38 |
| Cohesion, cu | kPa | 0 |

TABLE 1-continued

| Installation process parameters | | | | | | | |
|---|---|---|---|---|---|---|---|
| Dilution factor, a | | | | | x | | 2 |
| Total installation duration, t_inst | | | | | min | | 20 |

| Jetting design | | |
|---|---|---|
| Jetting nozzle width, w_nozzle | mm | 20 |
| Jetting nozzle height, h_nozzle | mm | 1.2 |
| Nozzle opening area | mm^2 | 24 |
| Nozzle spacing | m | 1.5 |
| Jet impact area to exit area ratio | — | 10 |

| Pile toe geometry | | |
|---|---|---|
| Sohlneigung, alpha | deg | 0 |
| Lastneigung, delta | deg | 0.0 |
| Tapered tow resistance reduction | | 0% |

| Soil & suspension properties | | |
|---|---|---|
| Soil void ratio, e = v_por/v_soild | % | 0.5 |
| Soil porosity, n = v_por/v_total | % | 0.33 |
| Suspension void ratio, e = v_por/v_soild | % | 2 |
| Suspension porosity, n = v_por/v_total | % | 0.67 |
| Total unit weight soil, γs | kN/m^3 | 21 |
| Total unit weight suspension, γsus | kN/m^3 | 15.5 |

| Installation process | | |
|---|---|---|
| Installation velocity, v_inst | m/s | 0.025 |

| Jetting | | |
|---|---|---|
| Required volume flow to achieve dilution | m^3/s | 0.173 |
| Pile circumference, U | m | 34.6 |
| Number of nozzles | # | 23 |
| Nozzle exit velocity, v_exit | m/s | 313 |
| Jetting force | N | 2397 |
| Water jet impact pressure (e.g. >2 MPa for clay) | Mpa | 10 |
| | bar | 100 |
| Water jet width at next nozzle | mm | 200 |

| Pile properties | | |
|---|---|---|
| Pile weight in air, W_p | MN | 10.31 |
| | t | 1051 |

| Suspension settlement | | |
|---|---|---|
| Upwards water flow velocity in suspension | m/s | 0.0375 |
| Largest grain fraction remaining suspended | | |

| Installation toe resistance | | | | | | | | |
|---|---|---|---|---|---|---|---|---|
| Installation depth, d(t) | | 5 | 10 | 15 | 20 | 25 | 30 | m |
| Installation time, t | 0 | 3.3 | 6.7 | 10.0 | 13.3 | 16.7 | 20.0 | min |
| Air pressure inside pile, p_air, in | | 101 | 101 | 101 | 101 | 101 | 101 | kPa |
| Water level in pile above seabed, h_in | 30 | 27.50 | 24.50 | 21.50 | 18.50 | 15.50 | 12.50 | m |
| Suspension height above seabed inside pile, h_sus | 0 | 0.36 | 0.73 | 1.09 | 1.45 | 1.82 | 2.18 | m |
| Suspension pressure at toe, p_sus | | 456 | 505 | 555 | 604 | 654 | 703 | kPa |
| Hydrostatic pore pressure at toe, u_toe | | 451 | 501 | 551 | 601 | 651 | 701 | kPa |
| Vertical stress opposing bearing failure mech., sv' | | 4.5 | 4.0 | 3.5 | 3.0 | 2.5 | 2.0 | kN/m^2 |

| Jetting parameters | | | | | | | | |
|---|---|---|---|---|---|---|---|---|
| Required jetting pressure, p_jet | | 499 | 499 | 499 | 499 | 499 | 499 | bar |
| Required jetting pump power, P_jet | | 8.6 | 8.6 | 8.6 | 8.6 | 8.6 | 8.6 | MW |

| Water level control | | | | | | | | |
|---|---|---|---|---|---|---|---|---|
| Volume flow to lower water level inside pile, Q_level | | 1.36 | 1.60 | 1.60 | 1.60 | 1.60 | 1.60 | m^3/s |
| Required pump power to control water level, P_level | | 510.3 | 567.4 | 535.4 | 503.5 | 471.5 | 439.5 | kW |

| Soil column stability | | | | | | | | |
|---|---|---|---|---|---|---|---|---|
| Hydraulic gradient in center of soil column, i_stab | | 0.45 | 0.50 | 0.52 | 0.52 | 0.53 | 0.53 | — |

TABLE 1-continued

| | | | | | | | |
|---|---|---|---|---|---|---|---|
| Horizontal stress ratio (if < K = 0.5 --> failure), K_interface- | 0.50 | | | | | | — |
| Max toe bearing pressure | 253 | 229 | 204 | 180 | 155 | 131 | kPa |
| Installation toe resistance | 0.7 | 0.6 | 0.6 | 0.5 | 0.4 | 0.4 | MN |
| Installation toe resistance | 70 | 63 | 56 | 50 | 43 | 36 | tons |

The invention claimed is:

1. A monopile for a wind turbine comprising:
a body for insertion into a soil in an insertion direction during installation, the body having a toe at its distal end, and the toe defining an aperture into an internal cavity, wherein movement of the toe through the soil displaces soil laterally into a displaced soil region within the internal cavity;
one or more nozzles for directing a fluid to the displaced soil region during installation for transporting soil away from the displaced soil region, wherein the one or more nozzles are configured for localising the fluid within the internal cavity; and
a pumping system for evacuating fluid from the internal cavity during installation for reducing the soil suspension pressure within the displaced soil region.

2. The monopile according to claim 1, wherein the pumping system evacuates water from the internal cavity.

3. The monopile according to claim 1, wherein the pumping system evacuates air from the internal cavity.

4. The monopile according to claim 1, further comprising a controller for controlling the pumping system during pile installation to substantially match the soil suspension pressure within the displaced soil region to the fluid pressure within an adjacent region of the soil outside the monopile body.

5. The monopile according to claim 4, wherein the controller controls the pumping system to reduce the height of the water table within the internal cavity to below the water level outside the monopile body.

6. The monopile according to claim 1, wherein the body comprises a conical region in which the diameter of the monopile increases.

7. The monopile according to claim 1, wherein the toe is tapered.

8. The monopile according to claim 1, wherein the one or more nozzles are directed substantially tangentially with respect to a circumference of the monopile body for directing fluid at the body's interior surface.

9. The monopile according to claim 1, wherein the one or more nozzles comprise a plurality of nozzles, with the plurality of nozzles being distributed around the body's interior surface.

10. The monopile according to claim 1, wherein the one or more nozzles are directed in the range of 90-180 degrees to the insertion direction.

11. A wind turbine foundation system, comprising:
a monopile for a wind turbine comprising:
a body for insertion into a soil in an insertion direction during installation, the body having a toe at its distal end, and the toe defining an aperture into an internal cavity, wherein movement of the toe through the soil displaces soil laterally into a displaced soil region within the internal cavity;
one or more nozzles for directing a fluid to the displaced soil region during installation for transporting soil away from the displaced soil region, wherein the one or more nozzles are configured for localising the fluid within the internal cavity; and
a pumping system for evacuating fluid from the internal cavity during installation for reducing the soil suspension pressure within the displaced soil region; and
a pressurised fluid supply for supplying the fluid to the nozzles.

12. A method of installing a monopile for a wind turbine, the monopile comprising a body for insertion into a soil in an insertion direction during installation, the body having a toe at its distal end, and the toe defining an aperture into an internal cavity, wherein movement of the toe through the soil displaces soil laterally into a displaced soil region within the internal cavity; the monopile further comprising: one or more nozzles for directing a fluid to the displaced soil region during installation for transporting soil away from the displaced soil region, wherein the one or more nozzles are configured for localising the fluid within the internal cavity; and a pumping system for evacuating fluid from the internal cavity during installation for reducing the soil suspension pressure within the displaced soil region, the method comprising:
inserting the toe into the soil;
forcing the body in the insertion direction;
supplying the fluid to the one or more nozzles to direct the fluid at the displaced soil region; and
driving the pumping system to evacuate fluid from the internal cavity to reduce the soil suspension pressure within the displaced soil region.

13. The method according to claim 12, further comprising controlling the pumping system to substantially match the soil suspension pressure within the displaced soil region to the fluid pressure within a laterally adjacent region of the soil outside the monopile body.

14. The method according to claim 13, wherein the controlling of the pumping system comprises controlling the pumping system to reduce the height of the water table within the internal cavity to below the water level outside the monopile body.

* * * * *